(12) United States Patent
Janes et al.

(10) Patent No.: US 12,523,298 B2
(45) Date of Patent: Jan. 13, 2026

(54) MULTIPURPOSE GASKET FOR A RIGID COIL IN A SWITCHED RELUCTANCE MOTOR

(71) Applicant: Caterpillar Inc., Peoria, IL (US)

(72) Inventors: Brian R. Janes, Chillicothe, IL (US); Andrew A. Friebohle, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 373 days.

(21) Appl. No.: 18/366,216

(22) Filed: Aug. 7, 2023

(65) Prior Publication Data

US 2025/0052322 A1 Feb. 13, 2025

(51) Int. Cl.
*F16J 15/10* (2006.01)
*H02K 1/24* (2006.01)

(52) U.S. Cl.
CPC .......... *F16J 15/102* (2013.01); *F16J 15/104* (2013.01); *H02K 1/246* (2013.01)

(58) Field of Classification Search
CPC ......... F16J 15/102; F16J 15/104; H02K 1/246
See application file for complete search history.

(56) References Cited

U.S. PATENT DOCUMENTS

| 3,126,518 A | 3/1964 | Johannson |
| 6,231,050 B1 * | 5/2001 | Raden ................. F02F 11/00 29/888.3 |
| 6,565,099 B1 | 5/2003 | Öttinger et al. |
| 2004/0183391 A1 | 9/2004 | Kimura et al. |
| 2017/0288477 A1 | 10/2017 | Ishiuchi |
| 2020/0166297 A1 * | 5/2020 | DeLugan .............. F28D 1/0233 |

FOREIGN PATENT DOCUMENTS

| CN | 1244610 A | 2/2000 |
| CN | 2566528 Y | 8/2003 |
| CN | 100525012 C | 8/2009 |
| EP | 2700145 A1 | 2/2014 |
| GB | 2207956 A | 2/1989 |
| JP | 2001-86671 A | 3/2001 |
| WO | WO 2012/145527 A1 | 10/2012 |

* cited by examiner

*Primary Examiner* — Gilbert Y Lee
(74) *Attorney, Agent, or Firm* — Leydig, Voit & Mayer, LTD.

(57) ABSTRACT

A gasket includes a rectangle formed from a sheet of material for placement over a pole of a stator, the rectangle including: a first side opposite a third side of equal length; a second side opposite a fourth side of equal length; pluralities of inner tabs disposed on the inner edges of the first and third sides, each inner tab being bent downward at a first angle to a plane containing the rectangle; outer tabs disposed on outer edges of the first and third sides and bent downward at a second angle; an inner tab disposed on the inner edge of the fourth side and angled upward from the plane containing the rectangle at a third angle; and two second protrusions disposed at opposite ends of an outer edge of the second side and two fourth protrusions at opposite ends of an outer edge of the fourth side.

19 Claims, 12 Drawing Sheets

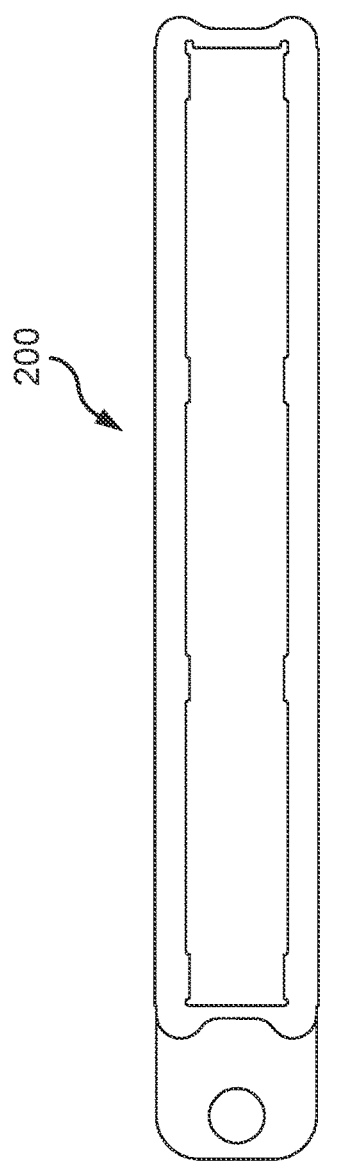
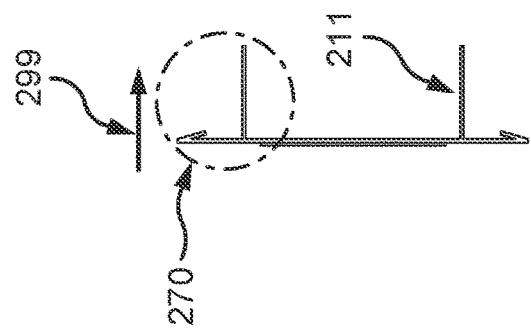
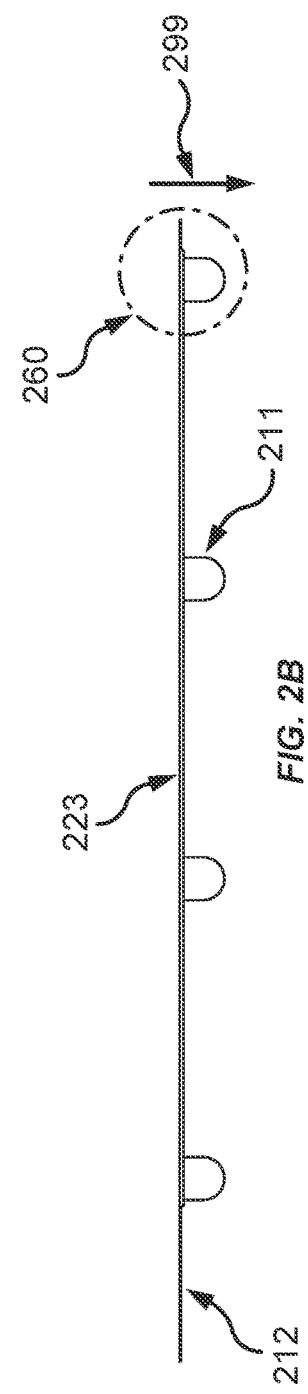

MULTIPURPOSE GASKET FOR A RIGID COIL IN A SWITCHED RELUCTANCE MOTOR

TECHNICAL FIELD

The present disclosure relates to switched reluctance machines and more particularly to a gasket for use in the stator of such machines.

BACKGROUND

Electric machines, both generators and motors, are widely used throughout the world to convert mechanical energy (derived from a variety of sources) to electrical energy and vice versa, respectively. Some of these electric machines are reluctance motors. A reluctance motor operates by inducing temporary magnetic poles on a ferromagnetic rotor. For the reluctance motor, the rotor does not include electrical windings. A desirable attribute of reluctance motors is the reluctance motor's ability to supply a larger starting torque than a traditional induction motor of approximately the same size.

US Patent Publication No. 2017/0288477 is directed to an unsaturated polyester resin composition for producing a molding resin for use in a switched reluctance motor. The unsaturated polyester resin composition comprises an unsaturated polyester, a crosslinking agent, a curing agent, a low profile additive, a filler, and a reinforcing fibrous material. The resin holds stator laminations in place but also fills the void between stator poles, not allowing coolant to flow around the coils and between adjacent poles.

A switched reluctance motor (SRM) includes concentrated windings on the stator, unlike a synchronous reluctance motor, which has distributed windings. Sometimes encountered with SRMs or other motors is that the stator core laminations may separate during operation. The stator core is often a stack of essentially identical laminations, the stack extending in the axial direction of the SRM. In addition, coils may not maintain equal spacing from the stator core on both sides of the inner diameter of the core. The term inner diameter is a term of the art when discussing a coil. More accurately, the "inner diameter" of the core is the inner circumference.

Further, a proper radial location of a wedge and coil may not always be maintained. Further still, oil may seep into the inner diameter of the stator where the rotor is located. There is also a need to enable wedges to be assembled without the need of disposable tooling and/or operator skill.

BRIEF SUMMARY

One or more aspects of the invention provide a gasket for a stator pole of a switched reluctance machine configured to be placed over the stator pole. The gasket may include: a rectangle formed from a sheet of material and configured for placement over a pole of a stator, the rectangle including: a first side opposite a third side of equal length; a second side opposite a fourth side of equal length; first and third pluralities of inner tabs disposed on the inner edges of the first and third sides, respectively, each inner tab of the first and third pluralities being bent downward at a first angle to a plane containing the rectangle; first and third outer tabs, each outer tab disposed on an outer edge of the first and third sides, respectively, and being bent downward at a second angle; a fourth inner tab disposed on the inner edge of the fourth side and angled upward from the plane containing the rectangle at a third angle; and two second protrusions disposed at opposite ends of an outer edge of the second side and two fourth protrusions at opposite ends of an outer edge of the fourth side.

Further, one or more aspects of the invention provide a system for assembling a coil on a pole of a stator. The system may include: a coil guide configured to be disposed over an inner surface of a pole, the coil guide including a rectangular cross section in a plane orthogonal to a radial line passing through a midpoint of the pole and a U-shaped cross section in a plane parallel to an end plane of the stator, an open end of the U-shape facing the pole, the coil guide further including a plurality of notches, each notch configured to receive a corresponding coil spacer and opening away from the pole; a plurality of corresponding coil spacers, each coil spacer configured to be snugly and removably disposed in one of the plurality of notches; and a gasket tool configured to receive a gasket, to place the gasket over a coil and, with the gasket disposed between the coil and the gasket tool, to fit the coil, the gasket, and the gasket tool over the pole, the coil guide, and the plurality of coil spacers, and to correctly dispose the gasket and the coil over the pole.

Further still, one or more aspects of the invention provide a method of assembling a stator. The method may include: placing a coil guide onto a radially inner portion of a pole of the stator; inserting each coil spacer of a plurality of coil spacers into a corresponding notch of a plurality notches in the coil guide; placing a gasket onto a gasket tool; placing the gasket and the gasket tool onto a coil with the gasket disposed between the coil and the gasket tool; placing the coil, the gasket, and the gasket tool over the pole; removing the coil guide, the plurality of coil spacers, and the gasket tool from the pole; repeating steps recited above for at least one adjacent pole; inserting, from a detachable tab end of each gasket, a wedge into a wedge groove between each pair of adjacent coils, poles, and corresponding gaskets, fitting each wedge securely between each pair of adjacent poles; and removing the detachable tab from each gasket.

BRIEF DESCRIPTION OF THE DRAWINGS

FIGS. 2A-2C depict top, side, and end views, respectively, of the gasket of FIG. 1 with tabs bent in accordance with one or more aspects of the present disclosure.

DETAILED DESCRIPTION

Figure 1:
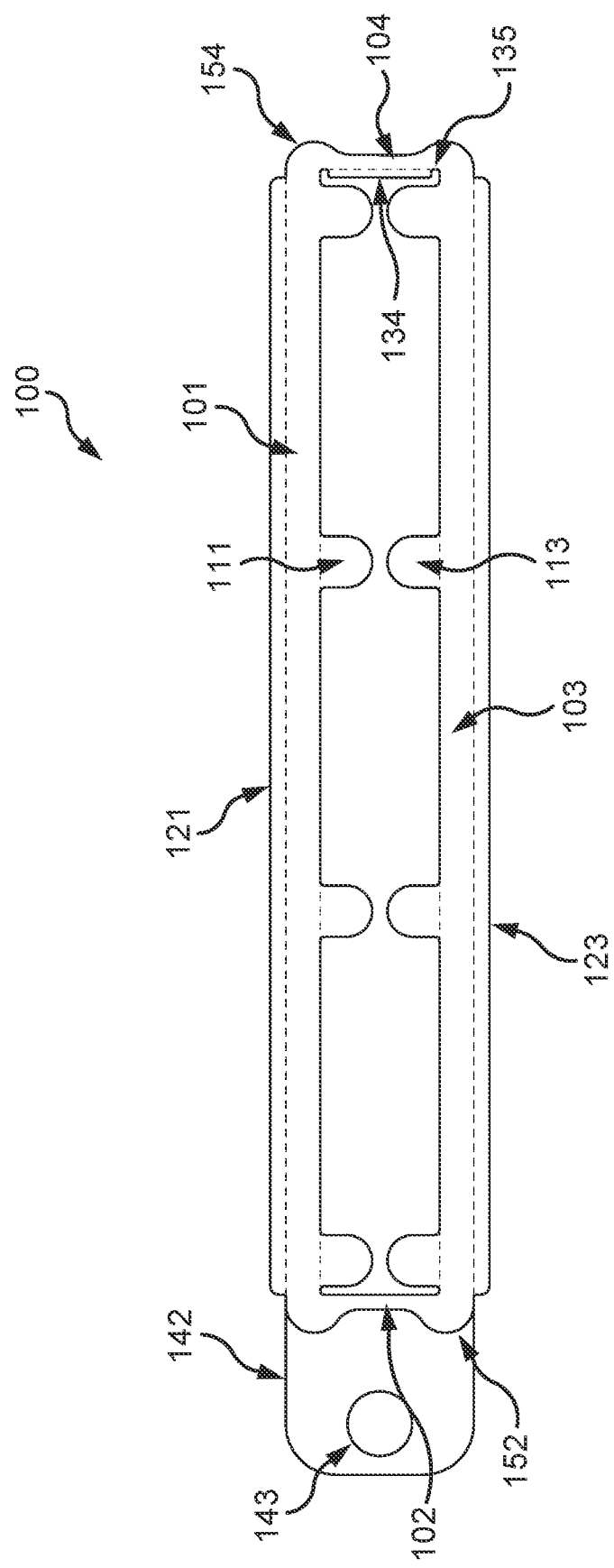
FIG. 1 depicts a plan view of a gasket in accordance with one or more aspects of the present disclosure.

A top view of an initially flat gasket is presented in FIG. 1. The gasket 100 may be made from a sheet of material. This material may be a laminate. In one or more aspects, the laminate may include a layer of polyethylene disposed between two layers of a meta-aramid. For example, biaxially-oriented polyethylene terephthalate (BoPET), which is commercially available as Mylar®, may be laminated between two layers of poly (meta-phenyleneisophthalamide), which is commercially available as Nomex®.

The gasket 100 is configured to be placed over a pole of a stator as discussed below. Thus, the shape of the gasket may depend on the shape of the pole. In the example shown in FIG. 1, the gasket 100 is rectangular in shape and includes longer first side 101 and third side 103, each of equal length, and shorter second side 102 and fourth side 104, again, each of these sides is of equal length. The widths of the sides may vary from one side to another. In the example presented in FIG. 1, the width w1 of the first side 101 and the width w3 of the third side 103 are equal, and the width w2 of the second side 102 and the width w4 of the fourth side 104 are equal. The interior space of the gasket 100 is largely empty with a few exceptions.

Disposed along the interior edge of the first side 101 are a first plurality of inner tabs 111. Similarly, disposed along the interior edge of the third side 103 are a third plurality of inner tabs 113. The first and third pluralities of inner tabs 111 and 113, respectively, may be equal in number. There may be two, three, four, or more tabs on the inner edge of both the first side 101 and the third side 103. The inner tabs of the first plurality of inner tabs 111 may be equally spaced along the inner edge of the first side 101. Similarly, the inner tabs of the third plurality of inner tabs 113 may be equally spaced along the inner edge of the third side 103. Each inner tab of the first plurality of inner tabs 111 may be opposite a corresponding inner tab of the third plurality of inner tabs 113. The first and/or the third plurality of inner tabs 111 and 113, respectively, may be positioned symmetrically between the inner edges of the second side and fourth side, 102 and 104, respectively.

Further, first outer tab 121 and third outer tab 123 may be disposed along the length of the outer edge of the first side 101 and third side 103, respectively. In one or more aspects, the outer tabs 121, 123 may extend in length from the inner edge of the second side 102 to the inner edge of the fourth side 104. The outer tabs 121, 123 may act as springs to manage the radial spacing of both the coil to the lamination stack that makes up the stator and the wedge to the inner diameter of the stator core. Further, the outer tabs 121, 123 may act as a seal to prevent oil from flowing into the inner diameter of the stator core.

A fourth inner tab 134 may be disposed along the inner edge of the fourth side 104. At one or both ends of the fourth inner tab 134, a notch 135 may be made. The fourth inner tab 134 plus the one or more notches 135 may span the separation between the inner edges of the first side 101 and third side 103. The fourth inner tab 134 and the notch 135 may work in combination to allow the assembly to be placed over stator poles of different lengths. That is, the stator pole may vary in length within allowable tolerances of the stator core length.

A detachable section 142 may be attached to the outer edge of the second side 102, as shown in FIG. 1, or of the fourth side 104. To facilitate detachment, a perforation may run along the outer edge of the second side 102 or fourth side 104, as required. The detachable section 142 may include a hole 143 for gripping the detachable section 142 and/or for positioning the gasket 100 on a gasket tool (discussed later). The hole 143 may be circular, but other shapes may also be used. The hole 143 may allow the detachable section 142 to be grasped, for example with a finger, when detaching.

The outer edge of the second side 102 may include two second protrusions 152 at opposite ends of the second side 102. The outer edge of the fourth side 104 may include two fourth protrusions 154 at opposite ends of the fourth side 104. In one or more aspects, the outer edge of each protrusion 152, 154 may be smoothly curved. Thus, the outer edge of each protrusion may lack sharp corners, or, mathematically, no discontinuity exists in the rate of change of the slope of the edge with respect to position as one moves from one end to the opposite end of the second or fourth side, as appropriate.

FIGS. 2A-2C depict top, side, and end views, respectively, of the gasket of FIG. 1 with tabs bent in accordance with one or more aspects of the present disclosure. The gasket 200 in FIG. 2A is the same gasket 100 presented in FIG. 1 except that the tabs 111, 113, 121, 123, 134 have been bent out of the plane of the rectangle.

Figure 3B:
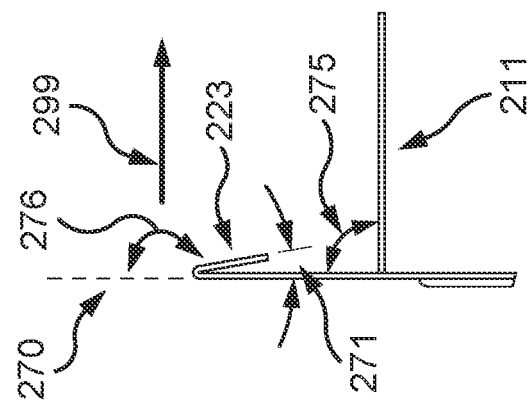
FIGS. 3A and 3B provide detail views of portions of FIGS. 2A-2C in accordance with one or more aspects of the present disclosure.

In FIG. 2B, the inner tabs 211 can be seen bent down out of the plane of the rectangle, which can be seen as 212. A detailed view in FIG. 3B shows inner tab 211 bent to make a first angle 275 with the plane of the rectangle. The outer tabs 223 may also be bent out of the plane of the rectangle. The component of the outer tabs 223 that points downward is slightly visible in FIG. 2B.

Figure 3A:
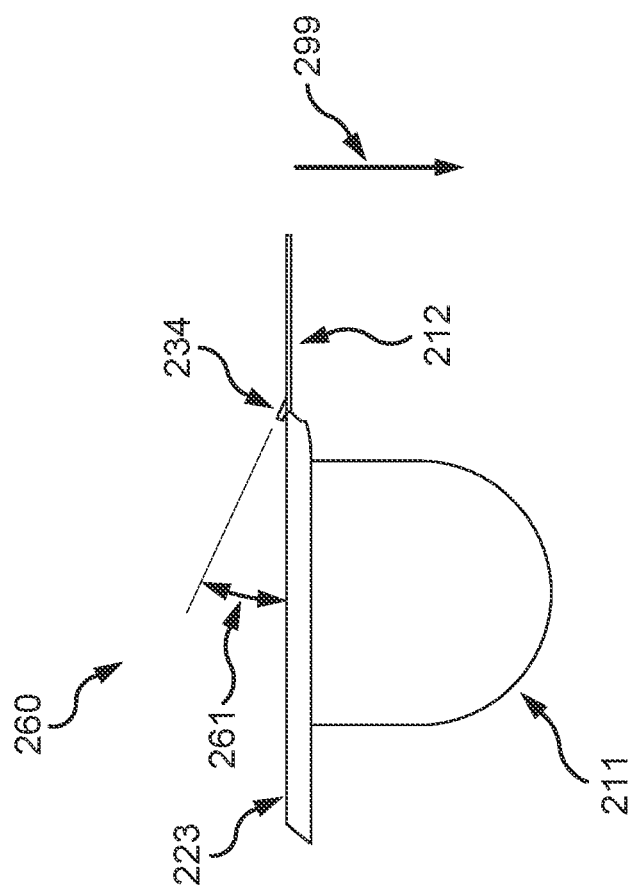

Continuing to refer to the detailed view in FIG. 3B as well as FIG. 3A, the first and third outer tabs 223 make a second angle 276 with the plane of the rectangle. The second angle 276 may be supplementary to angle 271 in FIG. 3B, that is, the second angle 276 plus angle 271 sum to 180°. The second angle 276 may measure greater than 90°. In one or more aspects, the second angle may measure between 165° and 175°, inclusive. The second angle 276 may measure 170°.

Detail 260 from FIG. 2B may be seen in FIG. 3A. A portion 212 of the gasket lying in the plane of the rectangle transitions to an upward bend of fourth inner tab 234 at a third angle 261. The third angle 261 may measure less than 30° (all angle measures shown in degrees). In one or more aspects, third angle 261 may be between 18° and 24°. The third angle 261 may be 21° in one or more aspects. An inner tab 211 and a projection of an outer tab 223 may also be seen in greater detail in FIGS. 3A and 3B.

Detail 270 from FIG. 2C, seen in FIG. 3B, shows that outer tab 223 has been bent in a downward direction 299.

In one or more aspects, the gasket may include a thermally formed bend that provides appropriate spring force. The material and amount of bend will have sufficient spring force to maintain radial spacing of a coil winding toward the outer diameter of a stator core while maintaining radial spacing of a wedge toward the inner diameter of the stator core. Further, this spring force will cause the gasket to take up space between the coil winding and the wedge to block possible oil paths, thus minimizing or preventing oil from entering the inner diameter of the stator core.

In an additional one or more aspects of the disclosure, a system for assembling a coil on a pole of a stator may include a coil guide, a plurality of coil spacers, and a gasket tool. Each of these parts of the system will be introduced below while describing a method for assembling a stator. The stator may be included in an electric machine, specifically, a generator or motor, recognizing that electric generators and electric motors are complementary machines. The electric machine may be a reluctance motor. In one or more aspects, the reluctance machine may be a switched reluctance motor.

Figure 4:
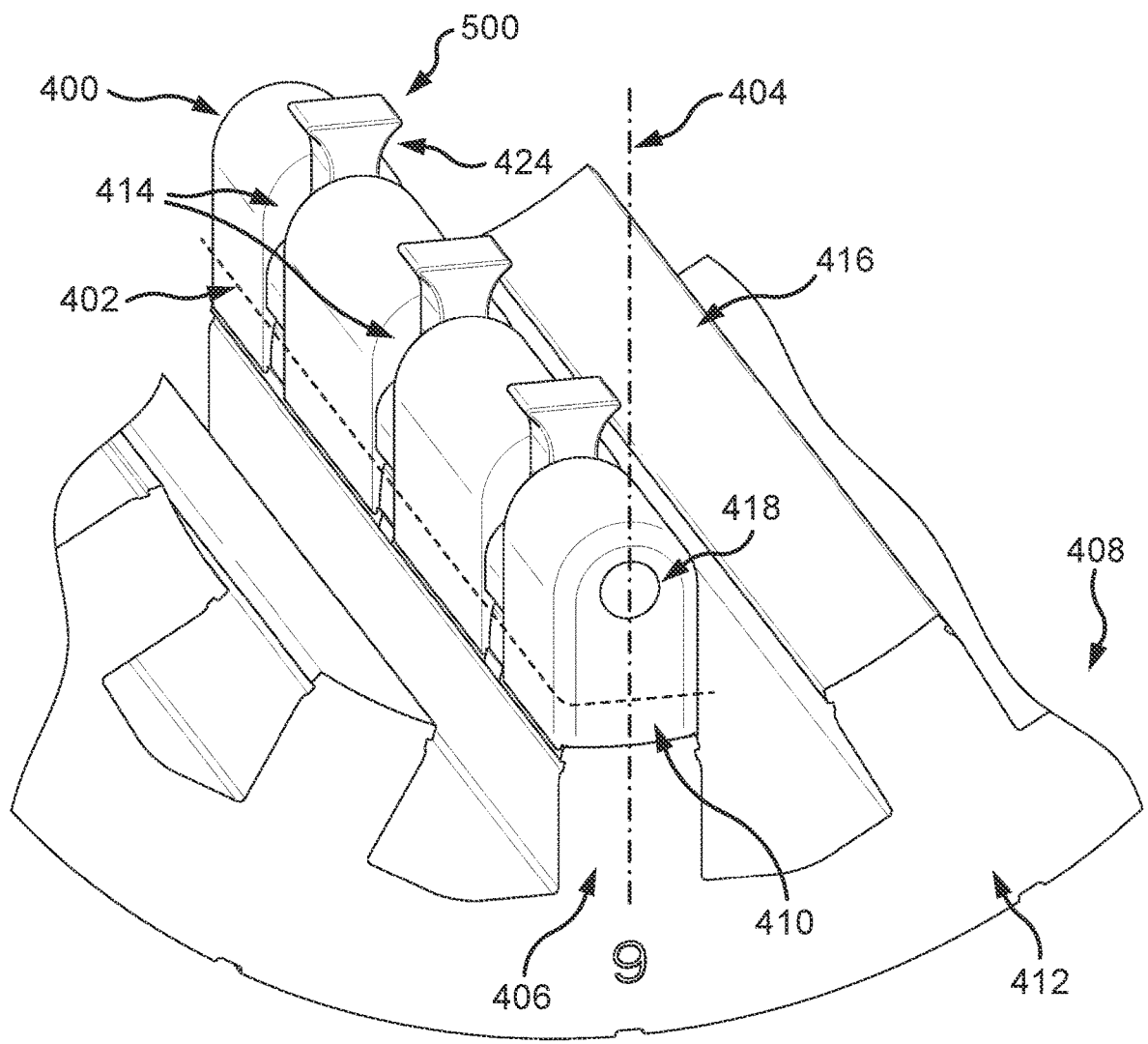
FIG. 4 depicts coil spacers inserted in notches in the coil guide in accordance with one or more aspects of the present disclosure.

Referring to FIG. 4, a coil guide 400 may have a rectangular cross section in a plane 402 that is orthogonal to a radial line 404 passing through a midpoint of a pole 406 of a stator 408. The coil guide 400 may also have a U-shaped cross section 410 in a plane parallel to an end plane 412 of the stator 408. The coil guide 400 may also include a plurality of notches 414 where each notch opens away from the pole 406. Each notch 414 may be configured to receive a corresponding coil spacer 500, which will be discussed below. The coil guide 400 may be configured to be disposed over a (radially) inner surface 416 of a pole with the open end of the U-shape facing the pole 406. In one or more aspects, one or more U-shaped sides may include a hole 418 to the interior space of the coil guide 400. In other aspects, an indentation may be used in place of the hole 418.

A coil spacer 500 for insertion into a notch 414 in a coil guide 400 is shown. A purpose of coil spacer 500 may be for strips of material the similar or same to the coil gasket material to be used in conjunction with the coil spacer 500 inserted into the notch 414. This material will be long enough to extend down a portion of the stator pole and act as guides to the assembly of the coil and gasket, preventing the tabs 111, 113, 211 on the gasket 100, 200 from getting stuck or binding during installation. The spacing of the notches 414 that the coil spacers 500 fit into will be dependent on the design specifics including the number of tabs and where the tabs are located on the gasket. The depth or thickness (that is, in the axial direction of the stator) of the coil spacer 500 corresponds to the width of the notch 414. The profile of the coil spacer 500 when viewed in a plane perpendicular to the thickness may include a downward facing arc, similar to the inverted U-shape to the coil guide 400. The downward facing arc creates two feet, one at each bottom edge of the coil spacer 500, that allow the coil spacer 500 to be seated on the coil guide 400 as shown in FIG. 4. Each side of the coil spacer above one of the feet may include an indentation 424 for ease of gripping the coil spacer, for example with a thumb and index finger of a user. The indentations 424 may allow the coil spacer 500 to be gripped more easily by a user when inserting or removing the coil spacer 500 from a notch 414.

Figure 5:
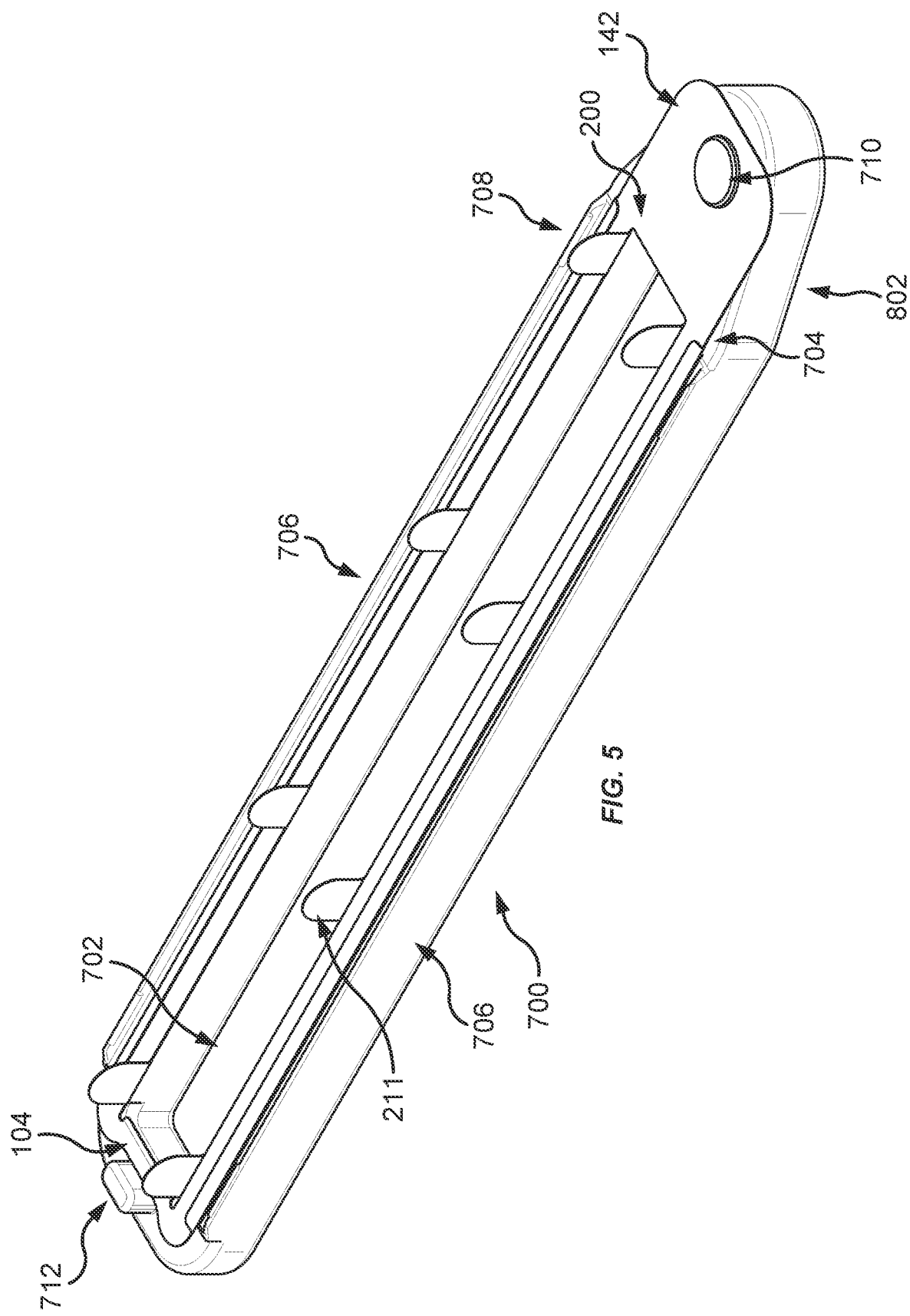
FIG. 5 depicts a gasket disposed on a gasket tool in accordance with one or more aspects of the present disclosure.

A gasket tool 700 configured to receive a gasket 100, 200 is depicted in FIG. 5. The gasket tool 700 generally corresponds to the shape of the gasket 200. The gasket tool 700 may be substantially rectangular in shape, with a rectangular opening 702. The opening 702 will allow the gasket tool 700 to be placed over the pole 406 of a stator. A top surface 704 onto which a gasket 200 may be placed is substantially flat with exceptions to be noted. Two opposing sides 706 of the gasket tool 700 may be raised slightly above the level to the top surface 704. At opposite ends of these slightly raised sides 706, the edge may curl inward slightly 708. The gasket tool 700 may also extend to support a detachable tab 142. The tool gasket 700 may include a raised feature 710, for example a circle, that corresponds to the hole 143 in the detachable tab 142. The raised shape may be used to correctly position the gasket 100, 200 on the gasket tool 700 and in the final placement of the gasket on a pole. The gasket tool 700 may include other features to properly position the gasket 100, 200. A second raised feature 712 may be situated on the top surface 704 to position the fourth side 104 of the gasket 100, 200.

Still referring to FIG. 5, the gasket 200 may be positioned so that the inner tabs 211 point away from the gasket tool 700. The hole 143 in the detachable tab 142 of the gasket 200 may be secured by the raised feature 710 on the gasket tool 700. The outer edge of the fourth side 104 of the gasket 200 may be guided into position by the second raised feature 712. In one or more aspects, the gasket tool 700 may be angled 802 under the detachable tab 142 so as not to support the edges of the detachable tab 142. This may allow an operator to handle the gasket 200 more easily.

Figure 6:
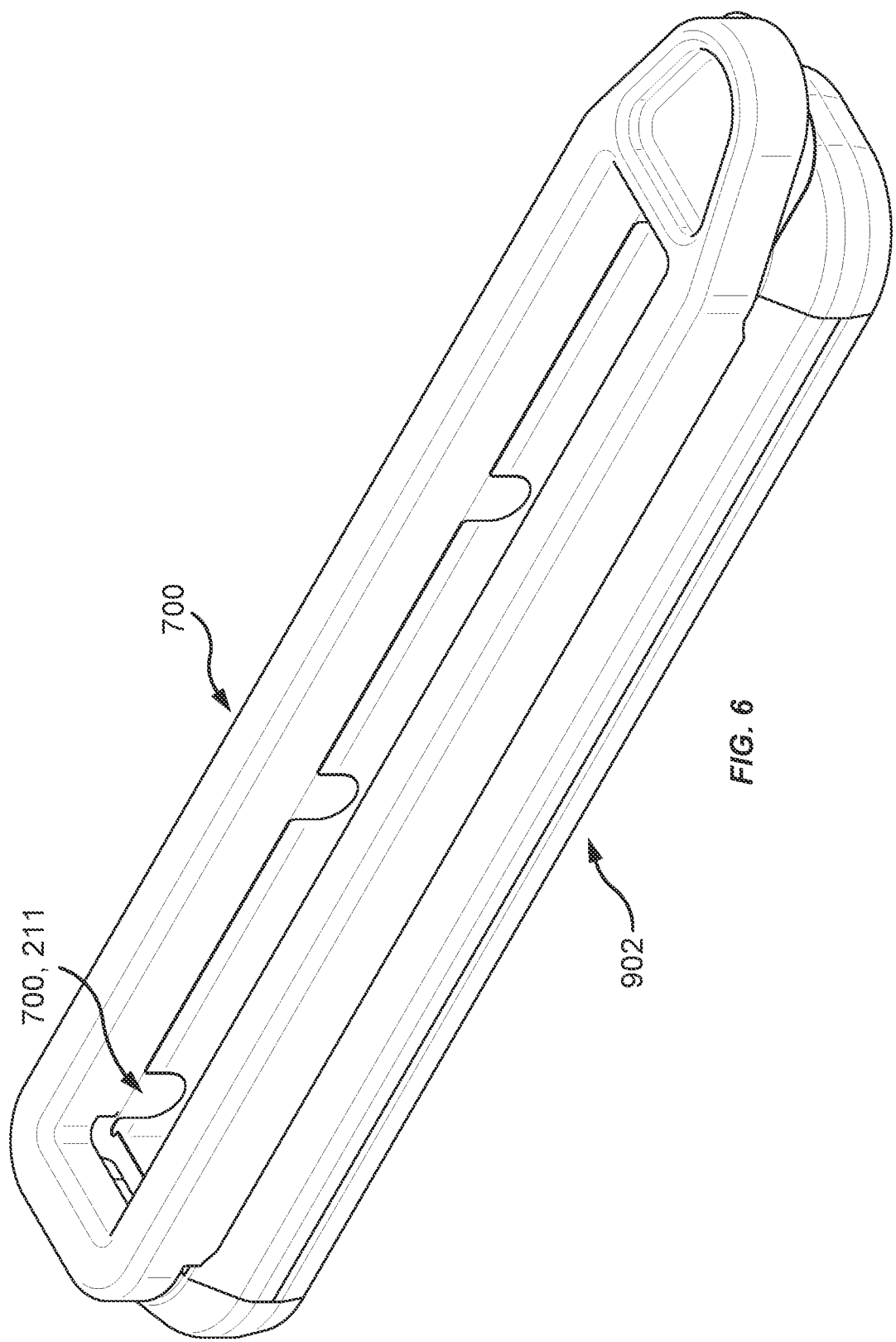
FIG. 6 depicts a gasket on a gasket tool disposed on a coil in accordance with one or more aspects of the present disclosure.

FIG. 6 presents an inverted gasket tool 700 holding a gasket 200 as the two are positioned on a coil 902. The gasket 200 may be disposed between the coil 902 and the gasket tool 700. The inner tabs 211 are shown pointing toward the coil 902. Inner tabs 211 may cover a small percentage of the height of the coil 902 all the way up to the full height of the coil 902. The triangular depression at one end of the gasket tool may be used for hand placement of a user to be able to hold all the parts together during assembly. Any shape may be used that allows the stated function to be performed.

Figure 7:
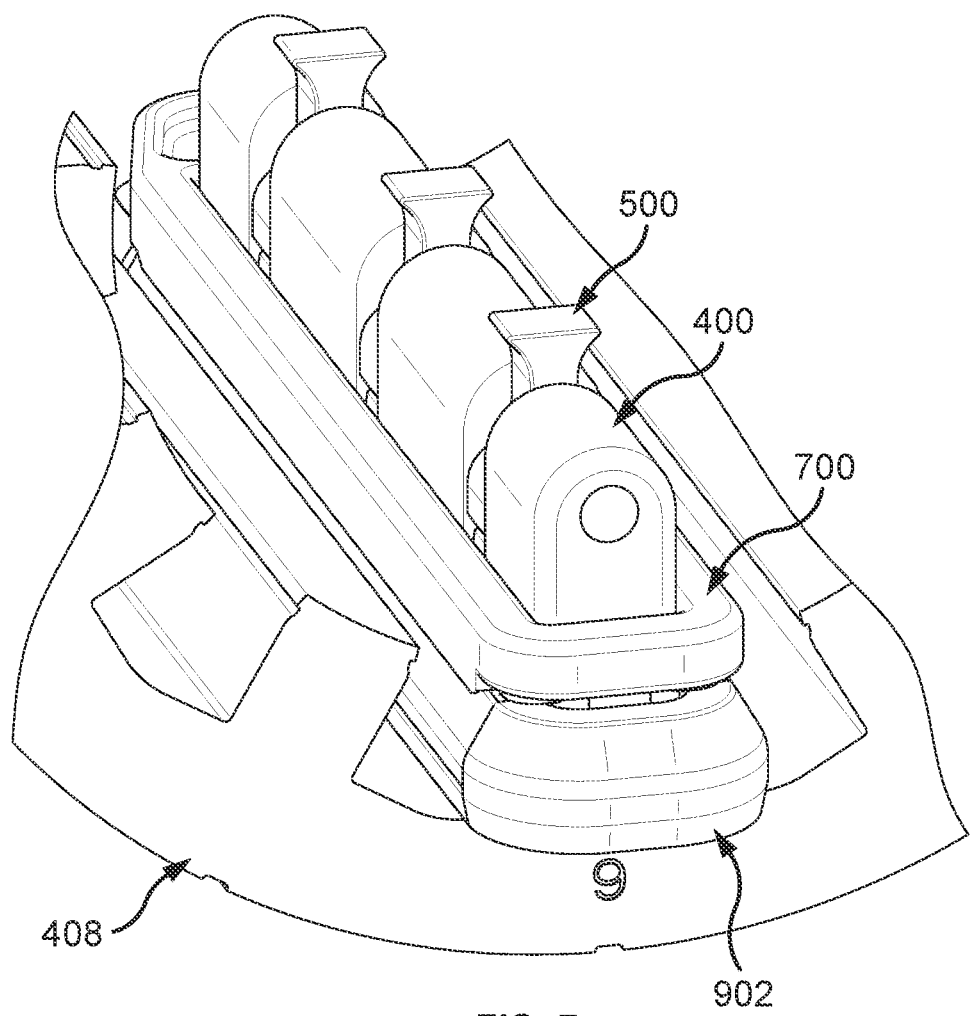
FIG. 7 depicts a coil, a gasket tool, and a gasket between the coil and the gasket tool positioned over a pole having been aligned by the coil guide in accordance with one or more aspects of the present disclosure.

The combined gasket tool 700, gasket (not readily visible), and coil 902 are shown in FIG. 7 disposed on a pole (not visible). The coil 902 and gasket are disposed on the pole of the stator 408 along with the assembly tools of the coil guide 400, the coil spacers 500, and the gasket tool 700.

Figure 8:
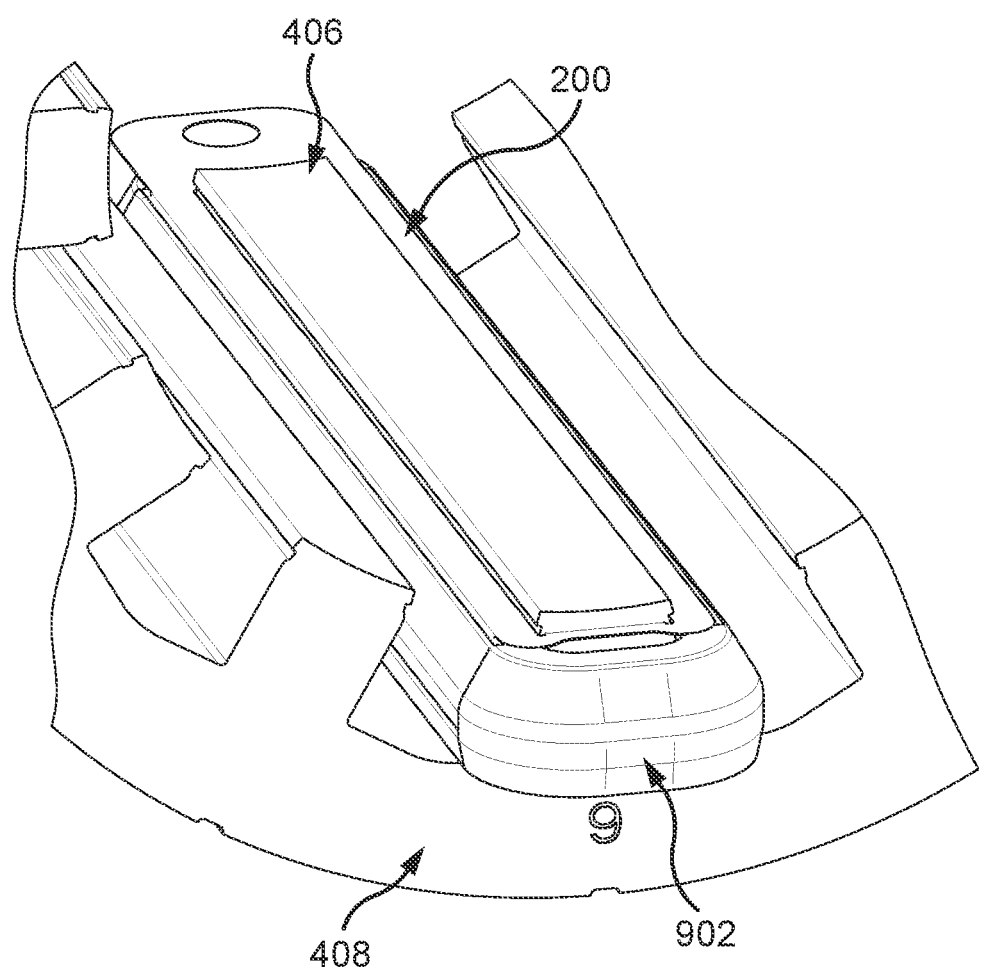
FIG. 8 depicts a coil and a gasket mounted on a pole in accordance with one or more aspects of the present disclosure.

In FIG. 8, the assembly tools have been removed, leaving the coil 902 and the gasket 200 disposed around the pole 406 of the stator 408. The outer tabs 121, 123 of the gasket 100 may act as springs to manage the radial spacing of the coil 902 to the lamination stack that makes up the stator 408. Further, the outer tabs 121, 123, may act as a seal to prevent oil from flowing into the inner diameter of the stator core.

Figure 9:
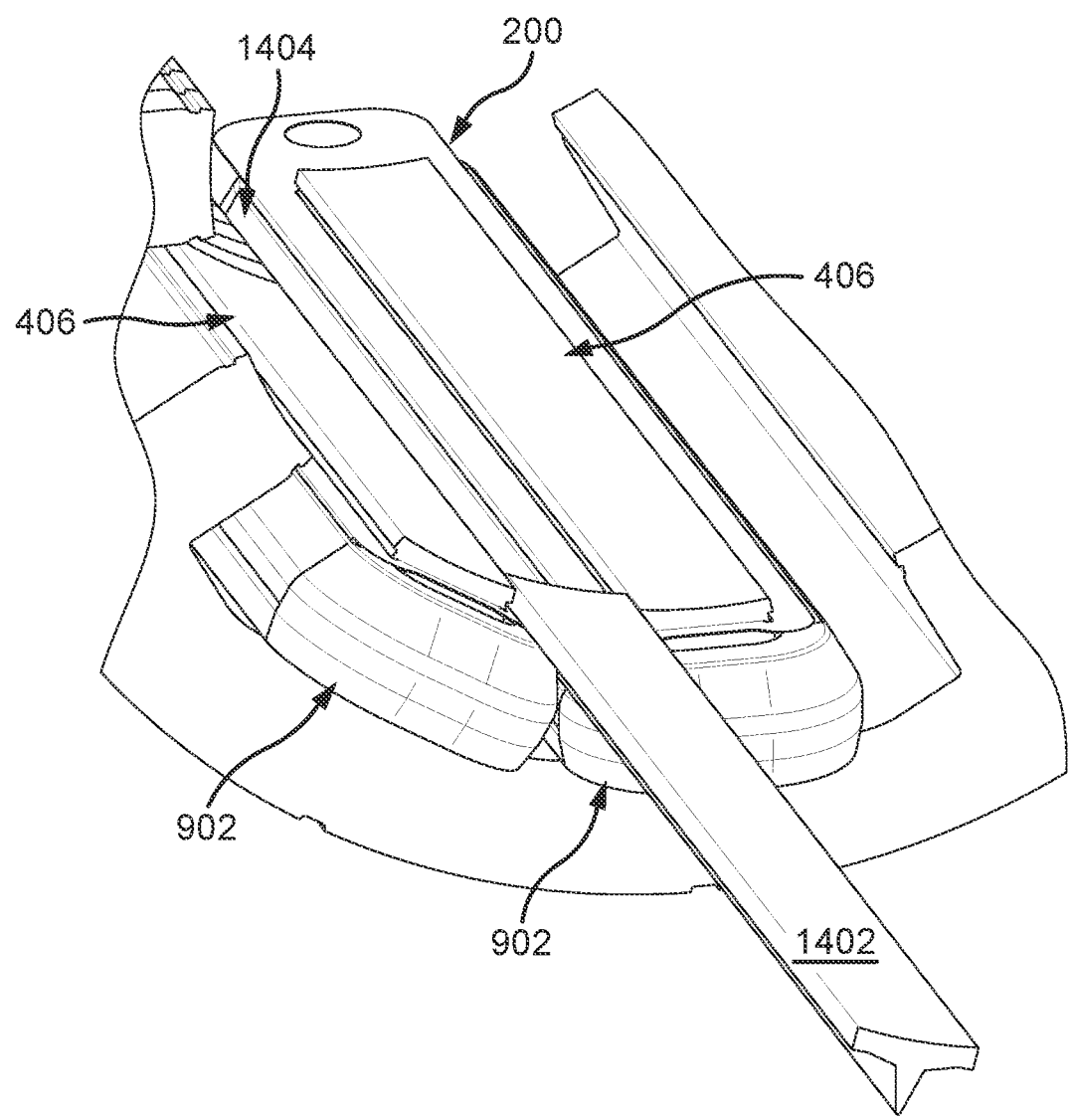
FIG. 9 depicts a wedge being inserted into a wedge groove between adjacent poles and corresponding coils in accordance with one or more aspects of the present disclosure.

FIG. 9 depicts a wedge 1402 being inserted into a wedge groove 1404 formed by two adjacent poles 406 and the respective coils 902 and gaskets 200 of the poles. The wedge 1402 may fit snugly so that positions of the components of the assembled stator will not move. The outer tabs 121, 123 of the gasket 100 may also act as springs to manage the radial spacing of the wedge 1402 to the inner diameter of the stator core 406.

Figure 10:
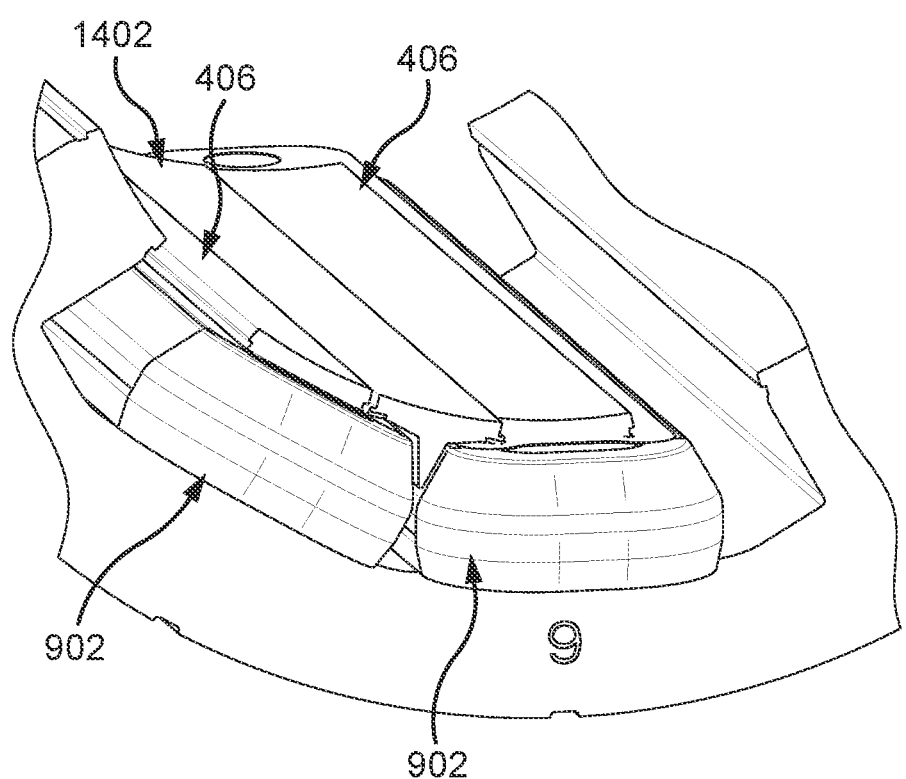
FIG. 10 depicts a wedge fully inserted into a wedge groove between adjacent poles and corresponding coils in accordance with one or more aspects of the present disclosure.

FIG. 10 shows the wedge 1402 fully inserted into the wedge groove between adjacent poles 406 with the corresponding coils 902 and gaskets (not readily visible).

Figure 11:
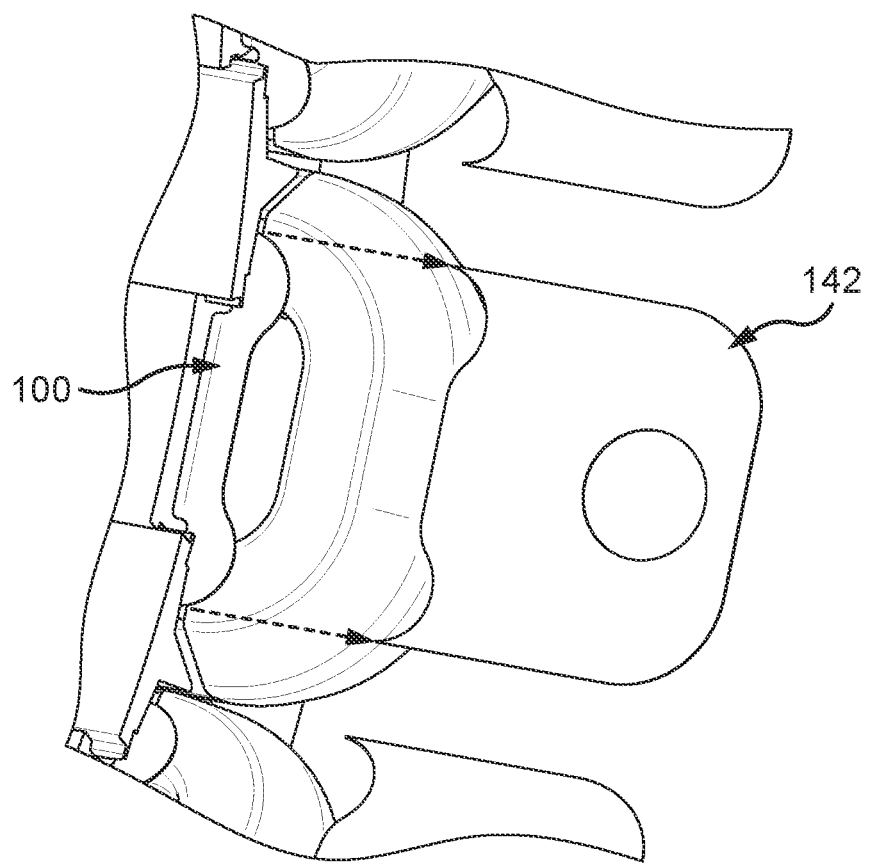
FIG. 11 depicts a detachable tab being removed from a gasket in accordance with one or more aspects of the present disclosure.

In FIG. 11, a detachable tab 142 is depicted being removed from a gasket 100.

The detachable tab may be used to align a gasket on a gasket tool and to allow a user to handle the gasket more easily. However, once the coil, gasket, and wedge have been properly installed, the detachable tab no longer serves a purpose and may be removed.

Figure 12:
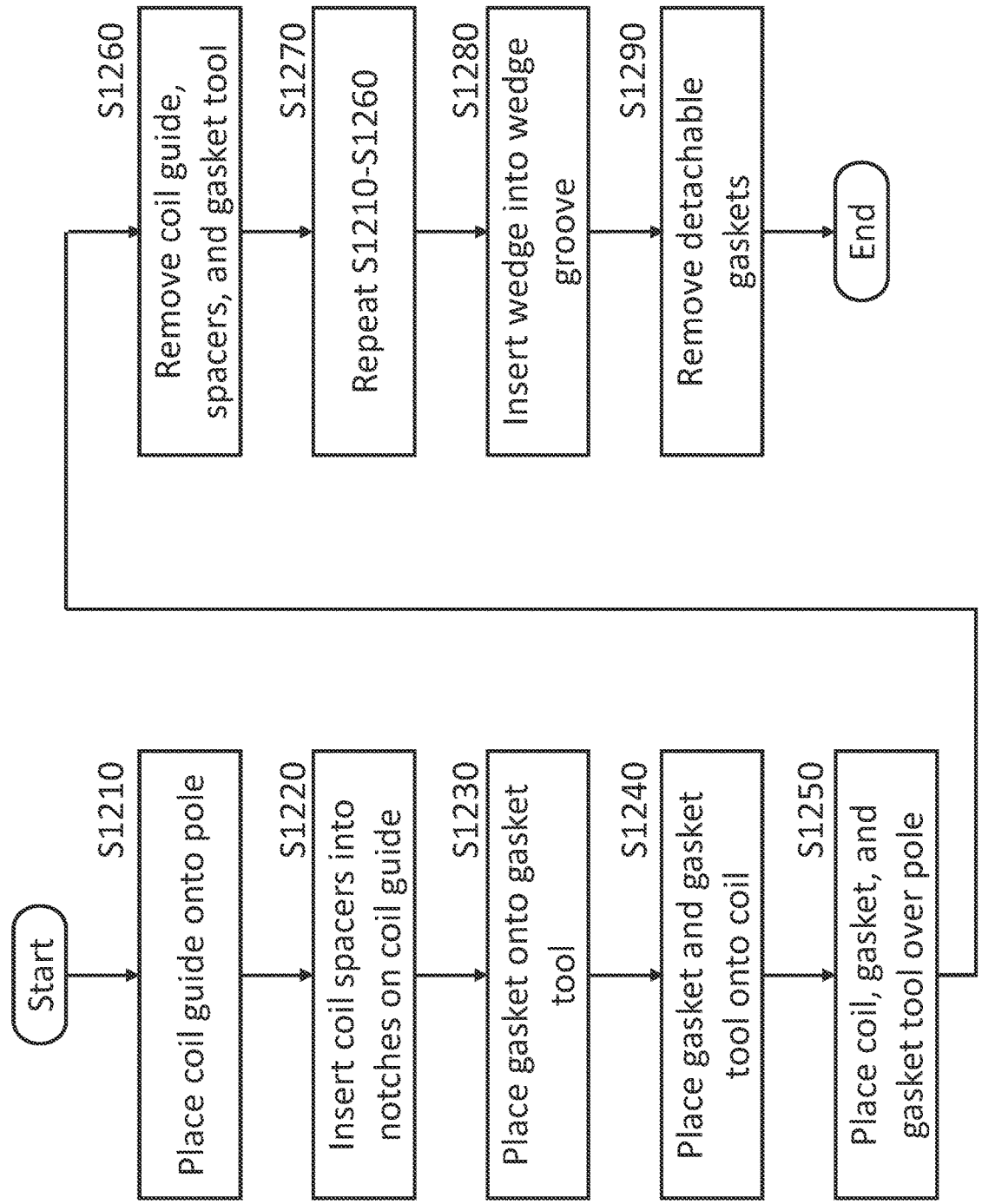
FIG. 12 depicts a flowchart accordance with one or more aspects of the present disclosure.

A method for assembling a stator has been presented above and with the preceding figures, particularly FIGS. 4-11. FIG. 12 presents a flowchart describing steps of a method of assembling a stator according to one or more aspects of the present disclosure.

A method of assembling a stator may include placing a coil guide onto a radially inner portion of a pole of the stator (S1210). The method may involve inserting each coil spacer of a plurality of coil spacers into a corresponding notch of a plurality of notches in the coil guide (S1220). A gasket may be placed onto a gasket tool (S1230). The gasket may be disposed so that inner tabs on the gasket are pointed away from the gasket tool. With the gasket on the gasket tool, the gasket and the gasket tool may be placed onto a coil (S1240). In one or more aspects, the gasket may be disposed between the coil and the gasket tool with the inner tabs of the gasket facing the coil. The combined trio of coil, gasket, and gasket tool may be placed over the pole with the coil closest to the base of the pole and the gasket tool occupying the most radially inward position of the trio (S1250). The coil guide, the plurality of coil spacers, and the gasket tool may be removed from the pole (S1260). Steps S1210-S1260 may be repeated for additional poles of the stator, particularly at least one adjacent pole (S1270). A wedge may be inserted into a wedge groove formed between a pair of adjacent coils, poles, and corresponding gaskets, fitting each wedge securely between the pair of adjacent poles (S1280). The detachable tab may be removed from each gasket (S1290). The detachable tab may be attached to the gasket by means of a perforated line in the appropriate shape.

INDUSTRIAL APPLICABILITY

A one-piece gasket 100 as presented above provides improvements to switched reluctance machines. The gasket 100 may be made from a laminate of two materials as discussed above. The gasket 100 may incorporate several features to address situations encountered. The gasket shape surrounds the pole 406 on both ends to prevent laminations from separating. Extensions may be added to utilize longer wedges 1402 that will further lock in the laminations on the pole 406. As laminations come loose, the laminations may move in an angular or rotational direction but not axially. By further extending the length of the wedge 1402, through this angular/rotational movement, the laminations may be trapped from extending beyond the length of the wedge 1402. Therefore, if the laminations do become loose, the movement of a loose lamination is restricted enough to prevent lamination-to-wire contact. Fold-over tabs 111, 113 may be incorporated to slide in between the pole 406 and coil 902 for spacing. Folded edges between the coil 902 and wedge 1402 may force the wedge 1402 away from the coil 902 to hold the radial position. The folded edge may act like a lip seal and block the oil path to the stator inner diameter (ID). Perforated pieces may be incorporated, which can take away the need for disposable tooling and operator skill to install wedges 1402 without coil damage.

The gasket 100 improves stators 408 in electric machines, particularly switched reluctance machines.

The gasket 100 is rectangular as seen in FIG. 1. The rectangular shape of the gasket 100 enables the gasket 100 to go around a pole 406 of a stator 408 to help keep the laminations of the stator 408 from separating during operation of the electric machine.

The fourth inner tab 134 and the notch 135 in the gasket 100 may work in combination to allow the assembly of the gasket 100 and coil 902 to be placed over stator poles 406 of different lengths. That is, the stator pole 406 may vary in length within allowable tolerances of the stator core length.

The outer tabs 121, 123 may act as springs to manage the radial spacing of both the coil to the lamination stack that makes up the stator 408 and the wedge 1402 to the inner diameter of the stator core. Further, the outer tabs 121, 123, may act as a seal to prevent oil from flowing into the inner diameter (that is, the inner surface 416 of a pole 406) of the stator core. The folded edge acts like a lip seal and blocks the oil path to the stator 408 inner diameter.

Gasket 100 also enables wedges 1402 to be assembled without the need for disposable tooling and the need for operator skill. A detachable section 142 with a perforation may allow the wedges 1402 to be installed without damage to the coil 902.

What is claimed is:

1. A gasket for a stator pole of a switched reluctance machine configured to be placed over the stator pole, the gasket comprising:
   a rectangle formed from a sheet of material, the rectangle including:
   a first side opposite a third side of equal length;
   a second side opposite a fourth side of equal length;
   first and third pluralities of inner tabs disposed on the inner edges of the first and third sides, respectively, each inner tab of the first and third pluralities being bent downward at a first angle to a plane containing the rectangle;
   first and third outer tabs, each outer tab disposed on an outer edge of the first and third sides, respectively, and being bent downward at a second angle;
   a fourth inner tab disposed on the inner edge of the fourth side and angled upward from the plane containing the rectangle at a third angle; and
   two second protrusions disposed at opposite ends of an outer edge of the second side and two fourth protrusions at opposite ends of an outer edge of the fourth side.

2. The gasket of claim 1, wherein the material includes a laminate including a polyethylene layer between two layers of a meta-aramid.

3. The gasket of claim 2, wherein
   the polyethylene layer includes biaxially-oriented polyethylene terephthalate, and
   each of the two layers of meta-aramid includes poly(meta-phenyleneisophthalamide).

4. The gasket of claim 1, wherein the first side is longer than the second side.

5. The gasket of claim 1, wherein a section including a hole is detachably connected to the outside edge of the second side or the fourth side.

6. The gasket of claim 1, wherein:
   the first plurality of inner tabs are equally spaced, and
   the third plurality of inner tabs are equally spaced.

7. The gasket of claim 6 wherein:
   the first and third pluralities of inner tabs are equal in number;
   each inner tab of the first plurality of inner tabs is disposed opposite a corresponding inner tab of the third plurality of inner tabs, and
   the inner tabs of the first plurality of inner tabs are positioned symmetrically between inner edges of the second and fourth sides.

8. The gasket of claim 1, wherein the sheet includes a single sheet of laminate.

9. The gasket of claim 1, wherein:
   the first angle measures between 45° and 135°, inclusive,
   the second angle measuring more than 90°, and
   the third angle measuring less than 30°.

10. The gasket of claim 1, wherein the first angle is approximately 90°.

11. The gasket of claim 1, wherein the second angle measures between 165° and 175°, inclusive.

12. The gasket of claim 1, wherein the third angle measures between 18° and 24°, inclusive.

13. The gasket of claim 1, wherein an outer edge of each protrusion is smoothly curved.

14. The gasket of claim 1 further includes a thermal-formed bend, formed to provide appropriate spring force.

15. A switched reluctance motor comprising a plurality of the gasket of claim 1.

16. A system for assembling a coil on a pole of a stator, the system comprising:
    a coil guide configured to be disposed over an inner surface of a pole, the coil guide including a rectangular cross section in a plane orthogonal to a radial line passing through a midpoint of the pole and a U-shaped cross section in a plane parallel to an end plane of the stator, an open end of the U-shape facing the pole, the coil guide further including a plurality of notches, each notch configured to receive a corresponding coil spacer and opening away from the pole;
    a plurality of corresponding coil spacers, each coil spacer configured to be snugly and removably disposed in one of the plurality of notches; and
    a gasket tool configured to receive a gasket, to place the gasket over a coil and, with the gasket disposed between the coil and the gasket tool, to fit the coil, the gasket, and the gasket tool over the pole, the coil guide, and the plurality of coil spacers, and to correctly dispose the gasket and the coil over the pole.

17. The system of 16, wherein the coil guide includes a plurality of similarly-shaped openings in each wall of the coil guide that is substantially parallel to an end of the stator.

18. The system of 16, wherein the plurality of notches are equally spaced from each other.

19. A method of assembling a stator, the method comprising:
    placing a coil guide onto a radially inner portion of a pole of the stator;
    inserting each coil spacer of a plurality of coil spacers into a corresponding notch of a plurality notches in the coil guide;
    placing a gasket onto a gasket tool;
    placing the gasket and the gasket tool onto a coil with the gasket disposed between the coil and the gasket tool;
    placing the coil, the gasket, and the gasket tool over the pole;
    removing the coil guide, the plurality of coil spacers, and the gasket tool from the pole;
    repeating steps recited above for at least one adjacent pole;
    inserting, from a detachable tab end of each gasket, a wedge into a wedge groove between each pair of adjacent coils, poles, and corresponding gaskets, fitting each wedge securely between each pair of adjacent poles; and
    removing the detachable tab from each gasket.

* * * * *